United States Patent [19]

Nishida et al.

[11] Patent Number: 4,792,931
[45] Date of Patent: Dec. 20, 1988

[54] OPTICAL SEISMIC DETECTOR

[75] Inventors: Katsuhiko Nishida, Kawasaki; Mansanari Shindo, Hachioji; Masaharu Suzuki, Kawasaki; Masamichi Kondo, Tama, all of Japan

[73] Assignee: Schlumberger Technology Corporation, New York, N.Y.

[21] Appl. No.: 910,585

[22] Filed: Sep. 23, 1986

[51] Int. Cl.[4] .................. H04R 1/02; H04R 11/00; G01H 1/00
[52] U.S. Cl. .................... 367/149; 367/140; 367/150; 367/185; 73/653; 73/655; 350/96.18; 250/230; 250/231 R
[58] Field of Search ............. 367/149, 140, 182, 185, 367/186, 187, 178, 150; 73/517 R, 517 AV, 652, 653, 655, 657, 658, 705; 250/231 R, 231 P, 230; 356/152, 28; 350/96.18; 181/122

[56] References Cited

U.S. PATENT DOCUMENTS

| | | | |
|---|---|---|---|
| 3,480,908 | 11/1969 | Codina | 73/244 |
| 3,648,055 | 3/1972 | De Lang | 250/231 R |
| 3,789,674 | 2/1974 | Anderson et al. | 250/231 R |
| 4,028,659 | 6/1977 | Rihn | 367/186 |
| 4,123,166 | 10/1978 | Botcherby et al. | 73/657 X |
| 4,152,940 | 5/1979 | Saito | 73/653 |
| 4,185,503 | 1/1980 | Saito | 73/653 |
| 4,285,570 | 8/1981 | Minemura et al. | 350/96.18 |
| 4,358,858 | 11/1982 | Tamura et al. | 350/96.18 X |
| 4,376,390 | 3/1983 | Rines | 73/653 X |
| 4,378,496 | 3/1983 | Brogardh et al. | 250/231 R X |

FOREIGN PATENT DOCUMENTS

| | | | |
|---|---|---|---|
| 3004878 | 8/1980 | Fed. Rep. of Germany | 73/655 |
| 138476 | 10/1979 | Japan | 73/653 |
| 817635 | 3/1981 | U.S.S.R. | 367/140 |
| 962768 | 9/1982 | U.S.S.R. | 73/653 |

Primary Examiner—Brian S. Steinberger
Attorney, Agent, or Firm—Keith Smith; Henry N. Garrana; Peter Y. Lee

[57] ABSTRACT

A detector for detecting the acceleration, the velocity or the displacement of a point is described. The detector includes a light source, at least two photoelectric elements spaced apart from each other over a predetermined distance and a focusing optical system disposed between the light source and the photoelectric elements; the combination being particularly suited for use as an optical seismic detector for detecting and mapping an underground stratum structure.

4 Claims, 7 Drawing Sheets

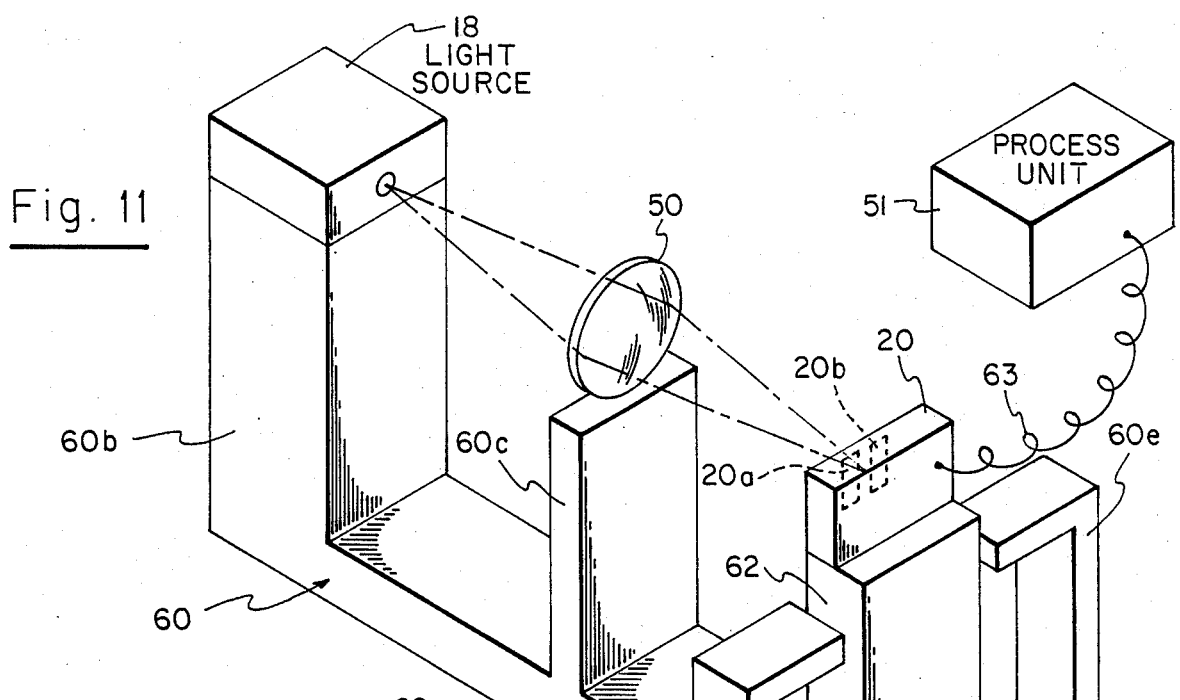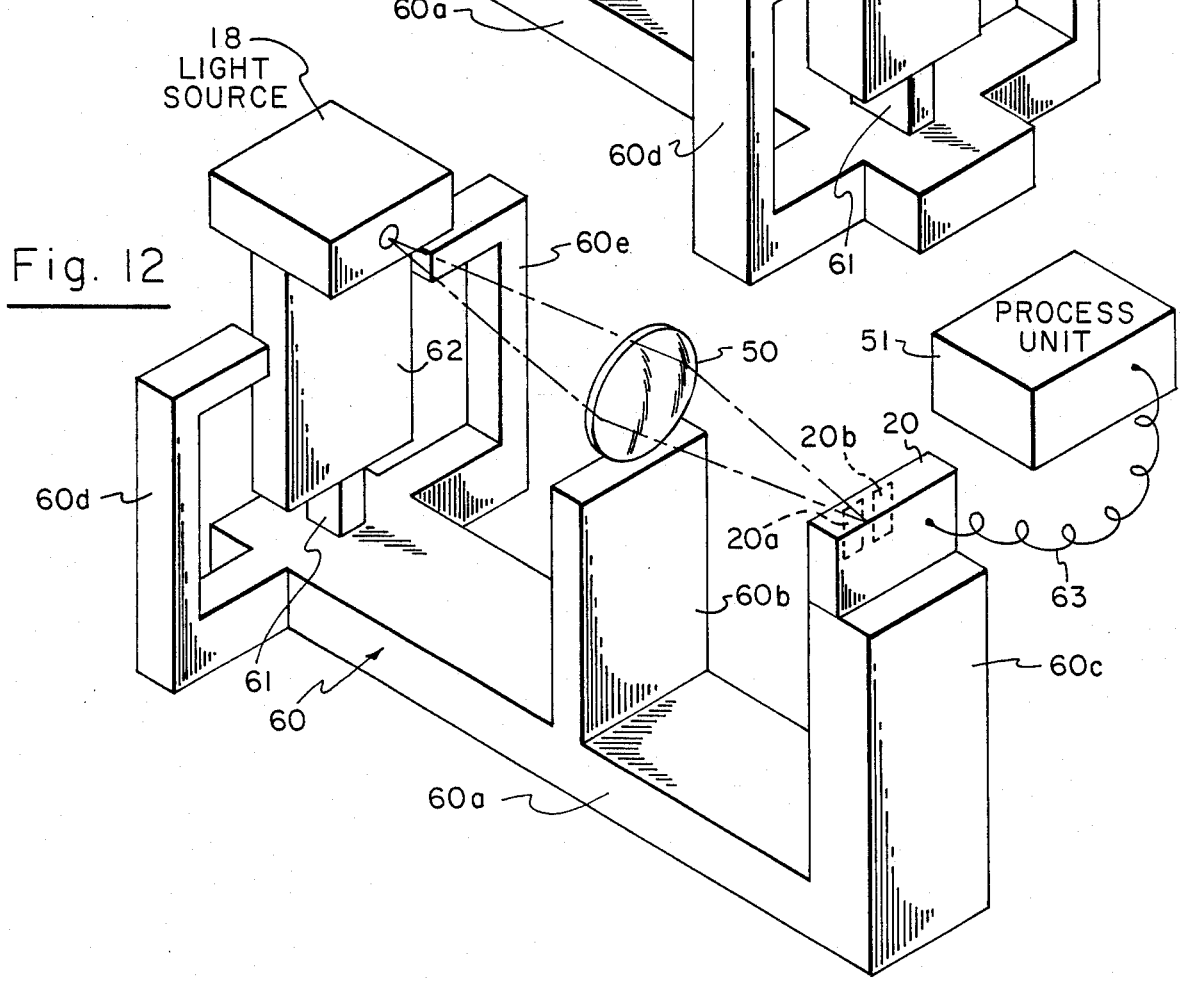

OPTICAL SEISMIC DETECTOR

FIELD OF THE INVENTION

The present invention relates generally to a detector for detecting the acceleration, the velocity or the displacement of a point, and, in particular, to a detector including a light source, at least two photoelectric elements spaced apart from each other over a predetermined distance and an optical system disposed between the light source and the photoelectric elements for focusing a light beam from the light source onto the photoelectric elements; such detector being suitable for use in detecting the acceleration, the velocity or the displacement of a target. More specifically, the present invention relates to a servo accelerometer which is particularly suited for use as an optical seismic detector for detecting and mapping an underground stratum structure.

BACKGROUND OF THE INVENTION

Seismic detectors called geophones are well known in the art. The geophone is basically a seismic-to-electrical transducer, and, when used, it is typically implanted in the surface of the earth. When a acoustic disturbance is generated at a location away from the place where the geophone is implanted, it propagates into the ground and the reflected disturbance is collected by the geophone for use in the analysis of the underground structure. In this case, the geophone basically detects the motion of the ground surface, i.e., the acceleration, the velocity or the displacement of a point of the ground surface. Although there are several variations, the geophone is mainly comprised of a moving mass, a spring for suspending the mass and a case for housing therein the moving mass suspended by the spring. With this structure, when the case is set in motion, for example, due to reception of the reflected disturbance, there is produced a relative motion between the moving mass and the case through the spring and such a relative motion is utilized to produce a variable, such as a voltage, for the measurement of the acceleration, the velocity or the displacement of a point of interest.

On the other hand, a servo accelerometer has recently come to draw much attention. The servo accelerometer is basically an accelerometer with a feedback circuit and thus it defines a closed-loop detector system. The accelerometer has been used for measuring the vibration of machine tools and buildings, and it is mainly comprised of a moving mass for detecting the acceleration and a spring for supporting the moving mass. In such accelerometer, the force applied to the moving mass due to the acceleration is electrically detected for measurement of the acceleration. Such accelerometer usually defines an open-loop detector system. Thus, the acceleration-responsive geophone may be considered as a kind of accelerometer.

The servo accelerometer is an improvement over the above-described normal accelerometer and it is so structured to measure the acceleration from an electric current which is required to produce a force or torque to bring the moving mass back to the original position. Thus, the servo accelerometer is significantly enhanced in accuracy as well as stability as compared with the normal open-loop type accelerometer. One of the remarkable features of the servo accelerometer is the static acceleration sensitivity, which allows the servo accelerometer to be used for the measurement of the angle or orientation, indicating the possibility for the application in the attitude control.

As described above, the servo accelerometer is far superior to the open-loop type accelerometer in many respects, but still it needs to be further improved so as to allow wider and more extensive applications.

SUMMARY OF THE INVENTION

The present invention has been made in view of the above-described circumstances, and, it has its primary object to provide an improved detector capable of detecting the acceleration, the velocity or the displacement of a point of interest with high resolution and increased sensitivity.

Another object of the present invention is to provide an improved detector for detecting vibration with high accuracy and sensitivity.

A further object of the present invention is to provide an improved servo accelerometer for detecting the acceleration at extremely high resolution and sensitivity.

A still further object of the present invention is to provide a detector for detecting the acceleration, the velocity or the displacement of a point of interest, which is reliable in operation and compact in size.

Hereinafter, the present invention will be described in detail by way of embodiments with reference to the accompanying drawings.

BRIEF DESCRIPTION OF THE DRAWINGS

FIGS. 11 and 12 are schematic illustrations showing modifications of the structure shown in FIG. 9.

DETAILED DESCRIPTION OF THE PREFERRED EMBODIMENTS

Figure 1:
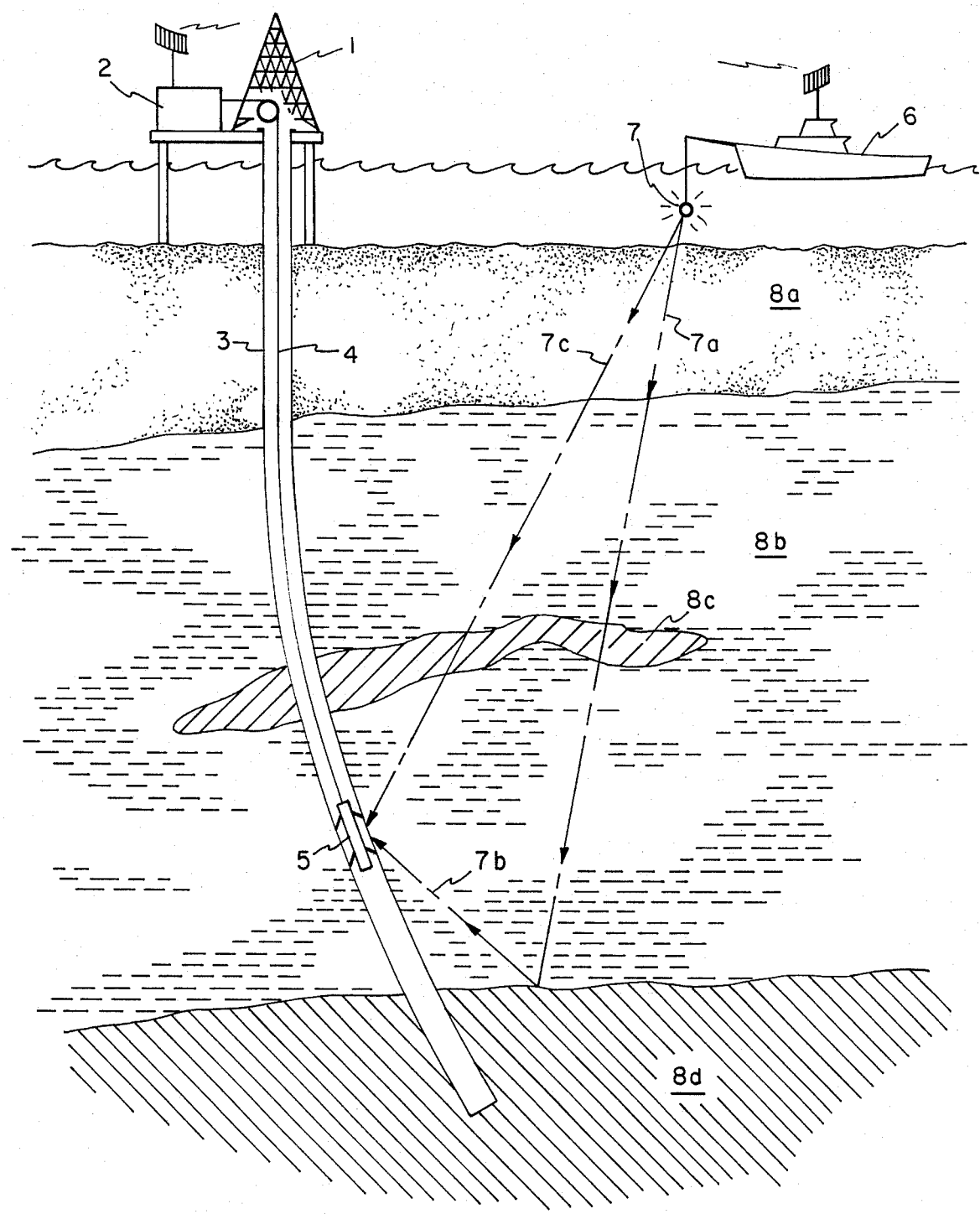
FIG. 1 is a schematic illustration showing a system of offshore vertical seismic measurement to which the optical seismic detector embodying the present invention may be advantageously applied.

Referring now to FIG. 1, there is schematically shown a system of offshore vertical seismic measurement, in which an optical seismic detector constructed in accordance with one embodiment of the present invention can be advantageously used. As shown in FIG. 1, there is an offshore rig 1 to support thereon a measurement and control unit 2. A downhole cable 4 extends from the measurement and control unit 2 through a borehole 3 drilled in the earth and is provided with a downhole tool 5 at its bottom end. The downhole tool 5 houses therein an optical seismic detector of the present invention, which is operatively coupled to the measurement and control unit 2 via the cable 4. As will be described in detail later, the optical seismic detector provided inside the downhole tool 5 is fundamentally constructed from a servo accelerometer and thus it detects the accleration at the site of the downhole tool 5.

A boat 6 floating at the surface of the water at a location away from the offshore rig 1 has a seismic source 7, which may be comprised of an air gun. When the seismic source 7 generates a seismic wave or disturbance, the seismic wave propagages into the earth which includes several strata 8a, 8b, 8c and 8d in the illustrated example. Here, the stratum 8c may be assumed, e.g., to be an oil reservoir. The seismic wave 7a propagates through the strata 8a, 8b and 8c and is reflected at the interface between the strata 8b and 8b to reach the optical seismic detector inside of the downhole tool 5. On the other hand, another seismic wave 7c directly reaches the optical seismic detector inside of the downhole tool 5 after travelling through the strata 8a, 8b and 8c. In this manner, various seismic waves reach the optical seismic detector inside of the downhole tool 5 to cause different accelerations, so that the analysis of the underground structure can be carried out from the seismic data thus collected. It is to be noted that the tool 5 will normally make measurements at a plurality of different depths in the borehole 3.

Figure 2:
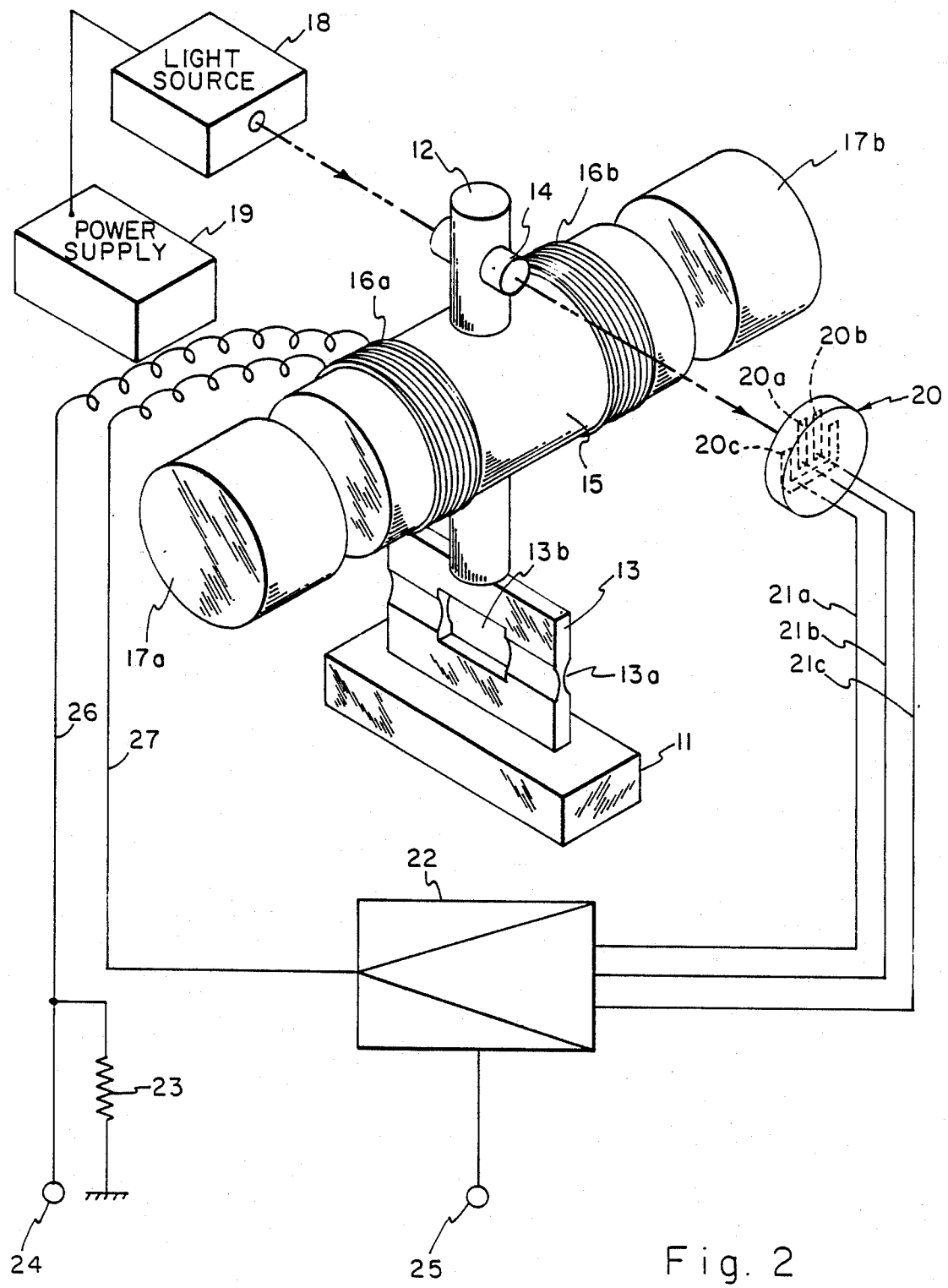
FIG. 2 is a schematic illustration showing the overall structure of the optical seismic detector constructed on the principle of a servo accelerometer.

FIG. 2 schematically shows in perspective an optical seismic detector 10 constructed in accordance with one embodiment of the present invention, and, as will be appreciated, the illustrated optical seismic detector has a basic structure of a servo accelerometer. Although not illustrated in the figures, the entire structure of FIG. 2 is completely enclosed in a sealed case, which, in turn, is fixedly mounted inside of the downhole tool 5. As shown in FIG. 2, the optical seismic detector 10 includes a base plate 11, which may be fixedly attached to the above-mentioned sealed case (not shown). On the base plate 11 is fixedly mounted a flexible hinge or a deflectable connector plate 13, shown as standing upright. The connector plate 13 is generally rectangular in shape and provided with a horizontal groove 13a on opposite sides to make the plate 13 locally extremely thin to remove the springy characteristic as much as possible. The connector plate 13 is also provided with a center rectangular hole to provide an even enhanced deflectability. It will be appreciated that the connector plate 13 deflects only in one direction, i.e., in the direction perpendicular to the plane of the connector plate 13 in the undeflected condition.

A vertical supporting rod 12 is fixedly attached to the top end surface of the connector plate 13 and extending vertically, therefrom. A horizontal supporting rod 15 is fixedly mounted to the vertical supporting rod 12. As shown, the vertical supporting rod 12 extends perpendicularly through the horizontal supporting rod 15 at the center thereof, thereby defining a cross-shaped supporting structure. The horizontal supporting rod 15 effectively defines a moving mass in the present accelerometer structure. Above the horizontal supporting rod 15 is provided a ¼ pitch gradient index rod lens 14 (also referred to as a Selfoc lens) which extends through the top portion of the vertical supporting rod 12 and is fixed attached thereto. It is to be noted that the present invention is not limited to the gradient index rod lens having the ¼ pitch and use may be made of a graident index rod lens of any pitch; however, the use of such a rod lens is preferred because of its high structural integrity and manufacturing simplicity. That is, it is only necessary to provide a hole in the vertical supporting rod 12 and to have the rod lens 14 inserted into the hole thus formed with an appropriate adhesive agent. In the preferred embodiment, the rod lens has a diameter ranging from 1–2 mm and the longitudinal length ranging from 2 to 5 mm.

A pair of torque coils 16a and 16b are provided as wound around the horizontal supporting rod 15, one at each side of the vertical supporting rod 12. And a pair of permanent magnets 17a and 17b are disposed on both sides of the horizontal supporting rod 15 such that each of the magnets 17a and 17b has a predetermined magnetic pole, e.g., N or S pole, positioned to face the corresponding end surface of the supporting rod 15 and spaced apart at a predetermined distance. Thus, by controlling the direction of the current passing through the torque coils 16a and 16b, the horizontal supporting rod 15 may be moved closer to the selected one of the permanent magnets 17a and 17b while being as deflected at the connector plate 13. These permanent magnets 17a and 17b are provided fixed in position and they are preferably provided as fixedly mounted on the before-mentioned case.

Also provided is a light source 18, which is preferably comprised of a laser diode or a light-emitting diode, and the light source 18 is connected to a power supply 19 which supplies a constant driving current to the light source 18. The light source 18 is also preferably fixedly mounted on the before mentioned case. At the side opposite to the light source 18 with respect to the rod lens 14 is disposed a light-receiving element 20 which is a one-chip dual-photodiode element in the illustrated embodiment. In other words, the element 20 is comprised of a single semiconductor chip in a monolithic structure and it is provided with a pair of photodiodes arranged side-by-side with a predetermined small gap therebetween. As will be described more in detail later, it is to be noted that the gap between the pair of built-in photodiodes may be made extremely small, e.g. in the range between a few microns and 10 microns, and, thus, together with the focusing function provided by the rod lens 14, which makes it possible to provide a light beam having a similarly small spot diameter, the sensitivity or resolution of the present system can be significantly enhanced. The illustrated photodetector 20 is preferably provided with a pair of photodiodes 20a and 20b and a third photodiode 20c, which is generally U-shaped and substantially surrounds the photodiodes 20a and 20b. This third photodiode 20c is used for the purpose of alignment. That is, in the present system, since the spot of a light beam used in the present system is very small, it is sometimes difficult to find where the beam spot is located. And, thus, it is desirous to provide such an alignment region surrounding the pair of detector photodiodes 20a and 20b.

The photodetector 20 is also preferably fixedly mounted on the before-mentioned case and it is electrically connected to a servo amplifier 22 through three separate lines 21a, 21b and 21c which are connected to the built-in photodiodes 20a, 20b and 20c, respectively. The servo amplifier 22, the detailed structure of which will be described later, is connected to a terminal 25 for a.c. output and also to one end of the paired torque coils 16a, 16b through a line 27. The other end of the paired torque coils 16a, 16b is connected to another terminal 24 for d.c. output and to one end of an output resistor 23, the other end of which is connected to ground, via a line 26.

In operation, under the equilibrium condition, the horizontal supporting rod 15 is located at the center between the pair of permanent magnets 17a and 17b, and, thus, the rod lens 14 is positioned in alignment with the optical path defined between the light source 18 and the photodetector 20. When an acceleration is applied to the horizontal supporting rod 15, the rod 15 swings from the center position due to the inertial force resulting from the applied acceleration. Such a swinging motion is detected by the photodetector 20, which thus produces an electrical signal having the information as to the amount of such a swinging motion. Then, the electrical signal thus produced is applied to the servo amplifier 22 which then supplies a feedback current to the pair of torque coils 16a and 16b such that the torque coils 16a and 16b produce electromagnetic fields for bringing the horizontal supporting rod 15 back into the original center position. That is, the torque coils 16a and 16b are so located to reside in the respective magnetic fields generated by the permanent magnetics 17a and 17b, respectively, so that when a feedback current is passed through the torque coils 16a and 16b, there are produced electromagnetic fields which can interact with the magnetic fields emanating from the permanent magnets 17a and 17b. Since the permanent magnets 17a and 17b are fixed in position and the rod 15 is swingable, the rod 15 is caused to move as a result of the interaction between these two magnetic fields.

The feedback current supplied to the torque coils 16a and 16b from the servo amplifier 22 is proportional to the acceleration applied to the rod 15 (here, it is assumed that the moving mass is substantially defined by the mass of the horizontally supporting rod 15, but, in reality, the moving mass includes other elements, such as coils 16a and 16b, vertical supporting rod 12 and rod lens 14), so that the acceleration applied to the rod 15 may be measured by measuring the feedback current. In this manner, the servo accelerometer differs significantly in structure from the open-loop type accelerometer, in which the force applied to the moving mass is directly measured in an open-loop circuit. Thus, the servo accelerometer of the present invention is not easily susceptible to external disturbance and is excellent in its frequency characterstic, which thus makes it possible to obtain high accuracy and stability.

As will be described in detail later, the dual photodetector 20 includes a pair of detector photodiodes 20a and 20b arranged side-by-side with a small gap therebetween. In the preferred embodiment, the beam spot is substantially equal in size to the gap between the pair of detector photodiodes 20a and 20b and in the order of a few microns to 10 microns. When the rod 15 is located at the equilibrium or center position, the light beam emitted from the light source 18 is focused onto the center position between the pair of detector photodiodes 20a and 20b through the rod lens 14. However, when the rod 15 swings in either direction according to the direction of acceleration applied thereto, the rod lens 14 also moves thereby causing the light beam passing therethrough to shift in position on the surface of the photodetector 20. In other words, the beam spot gradually moves into the corresponding one of the pair of detector photodiodes 20a and 20b, thereby causing the corresponding photodiode 20a or 20b to produce an electrical signal having the information as to the degree of deviation of the beam spot from the center position.

Figure 3:
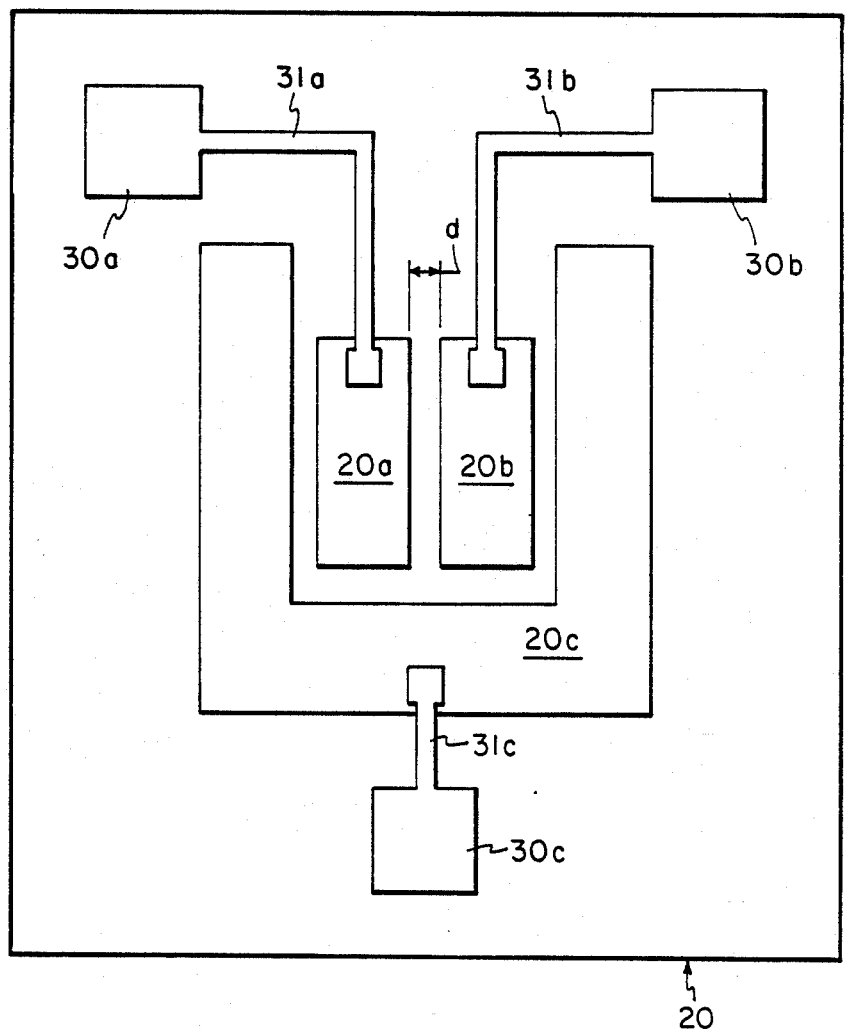
FIG. 3 is a plan view showing the structure of a dual photodetector suitable for use in the present invention.

FIG. 3 shows in plan view the detailed structure of the dual photodetector 20 provided in the optical seismic detector shown in FIG. 2. As shown, the dual photodetector 20 is constructed in the form of a single semiconductor chip and it is provided with a pair of first and second photodiodes 20a and 20b spaced apart from each other over a small distance d, which preferably ranges from a few microns to 10 microns, and with a third photodiode 20c, which is generally U-shaped and which substantially surrounds the pair of first and second photodiodes 20a and 20b. The pair of first and second photodiodes 20a and 20b are somewhat elongated in the vertical direction, and the first and second photodiodes 20a and 20b are connected to electrode pads 30a and 30b through leads 31a and 31b, respectively, for connection to external circuitry. Similarly, the third photodiode 20c is connected to the remaining electrode pad 30c via a lead 31c. It is to be noted that since the dual photodetector 20 is manufactured in the form of a single semiconductor chip, the gap d between the pair of detector photodiodes 20a and 20b can be made as small as practically possible, which thus makes it possible to increase the resolution significantly. The importance of this feature is increased when combined with the rod lens 14, defining a focusing optical system, which causes the light beam from the light source 18 to be focused onto the surface of the dual photodetector 20 thereby making it possible to obtain a beam spot of any desired size, which also contributes to enhance the resolution and thus the sensitivity of the entire detector system.

Figure 4:
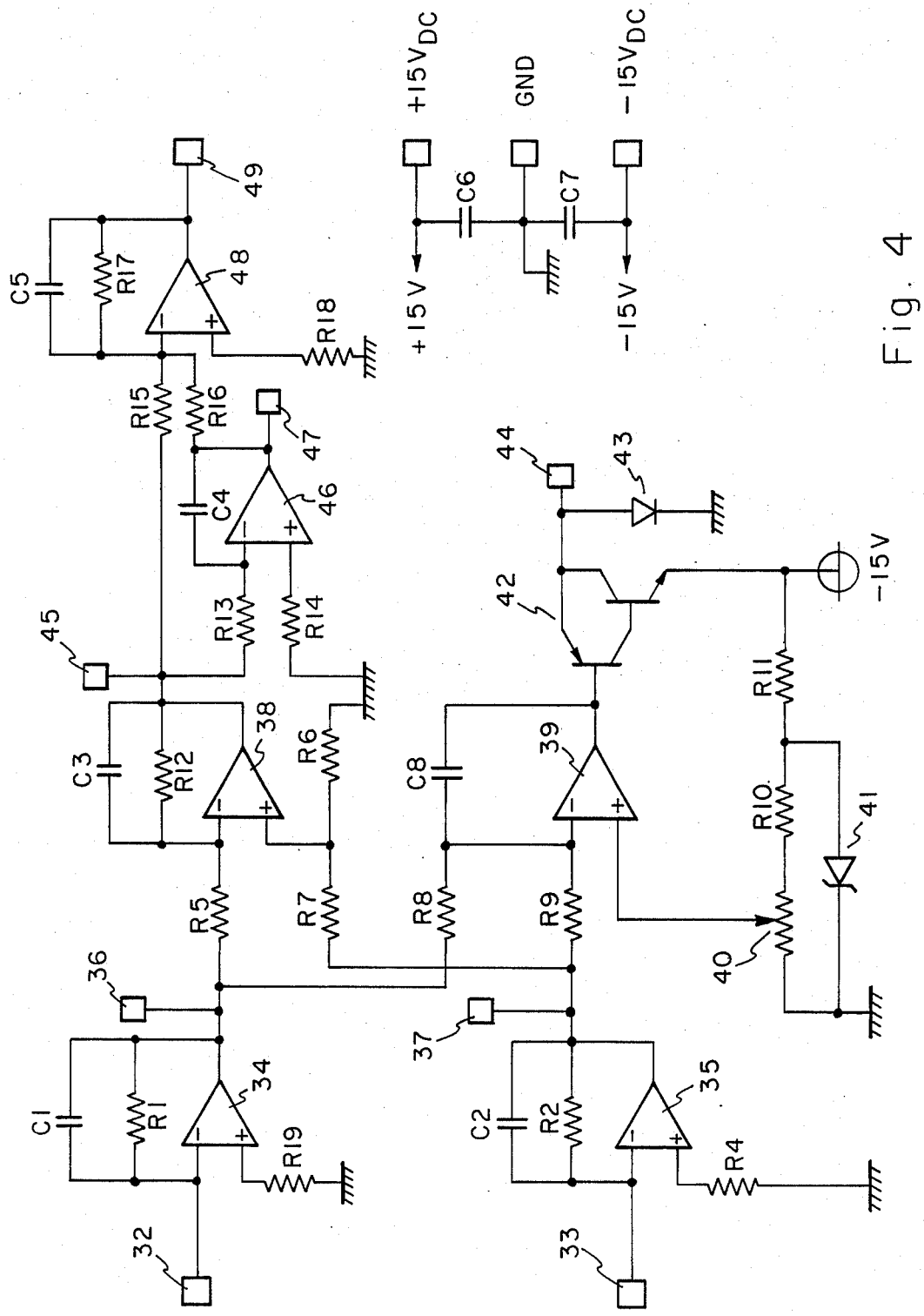
FIG. 4 is a circuit diagram showing the detailed structure of the servo amplifier 22 shown in FIG. 2.

FIG. 4 is a circuit diagram showing one embodiment of the servo amplifier 22 provided in the optical seismic detector shown in FIG. 2. As shown, the servo amplifier 22 includes a first input terminal 32 which is connected to the first detector photodiode 20a and a second input terminal 33 which is connected to the second detector photodiode 20b. The first input terminal 32 is connected to the inverting input of operational amplifier (hereinafter, simply referred to as "op map") 34 whose output is connected through a resistor R5 to the inverting input of op amp 38 and to the inverting input of op amp 39 through a resistor R8. Similarly, the second input terminal 33 is connected to the inverting input of op amp 35 which has its output connected to the non-inverting input of op amp 38 through a resistor R7 and to the inverting input of op amp 39 through a resistor R9. Thus, the op amps 34 and 35 each convert the photoelectric current signals from the respective detector photodiodes 20a and 20b into voltage signals. Test terminals 36 and 37 are connected to the output of op amps 34 and 35, respectively.

The op amp 38, in effect, functions as a comparator and has its output connected to the inverting input of an op amp 48 through a resistor R15 and to the inverting input of an op amp 46 through a resistor R13. Thus, the op amp 38 supplies at its output a difference signal between the two detection signals from the detector photodiodes 20a and 20b, which is proportional to the displacement of the lens 14 with respect to the center position. Connected to the output of op amp 38 is an a.c.

output terminal 45 which is connected to the terminal 25 shown in FIG. 2. On the other hand, the op amp 46 has its non-inverting input connected to ground through a resistor R14 and has its output connected to a d.c. output terminal 47, which, in turn, is connected to the terminal 24 shown in FIG. 2. The op amp 46 is, in effect, a low pass filter for filtering out the high frequency component beyond a predetermined cut-off frequency thereby making it possible to obtain the low frequency component. The op amp 48 has its non-inverting input connected to ground through a resistor R18 and has its output connected to a signal output terminal 49, which is connected to one end of the torque coils 16a and 16b shown in FIG. 2. Thus, the op amp 48 receives a sum of the displacement signal from the op amp 38 and the low frequency component of the displacement signal from the op amp 46 and then supplies a driving current to the coils 16a and 16b proportional to the summed signal. Accordingly, the input signals supplied at the first and second input terminals 32 and 33 are, after having been suitably amplified by the respective op amps 34 and 35, compared at the op amp 38, serving as a comparator, whose output signal is supplied to the signal output terminal 49 after amplification by the op amp 48.

It is to be noted that the present system functions as a servo accelerometer if the system operates in a frequency region which is lower than the cut-off frequency of op amp 46; whereas, the present system functions as a displacement detector if the system operates in a frequency region which is higher than the cut-off frequency of op amp 46 since the servo mechanism becomes inoperative in this case. In the preferred embodiment, the time constant of the servo mechanism in the structure shown in FIG. 2 is set to range from 1 msec to 3 sec.

On the other hand, the remaining op amp 39 has its non-inverting input connecting to a variable resistor 40, which is connected in series with a resistor R10 but in parallel with a Zener diode 41 serving as a voltage reference, and its output connected to a Darlington pair 42, which, in turn, is connected to a light source output terminal 44 and to ground through a diode 43. The Darlington pair 42 is also connected to a voltage supply, −15V in the illustrated example. The light source output terminal 44 may be connected to the power supply 19 shown in FIG. 2. Thus, the op amp 39 receives a sum of the two signals from the respective detector photodiodes 20a and 20b and compares this sum signal with a comparison signal produced by a combination of a voltage reference at Zener diode 41 and variable resistor 40 thereby supplying a difference signal as its output. This difference signal is amplified by the Darlington pair 42 to be used for driving the light source 18. As a result, it is controlled such that the light source 18 always emits constant light proportional to the comparison signal. There are also provided other resistors R and capacitors C connected as shown.

It should be understood that the particular structure shown in FIG. 4 is suitable for use as the servo amplifier 22 in the optical seismic detector shown in FIG. 2, but the present invention should not be limited only to the servo amplifier illustrated and a servo amplifier of another structure may also be used.

Figure 5:
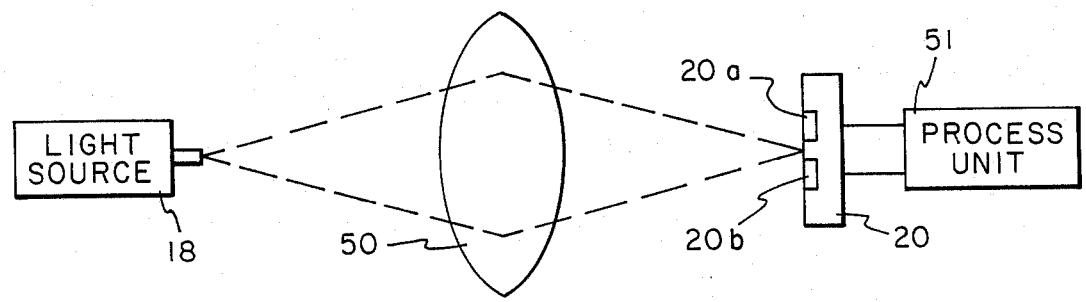
FIG. 5 is a schematic illustration showing one embodiment of the displacement detector for detecting the displacement of a point of interest constructed in accordance with another aspect of the present invention.

Now, another aspect of the present invention will be described with particular reference to FIGS. 5 through 8. In accordance with this aspect of the present invention, there is provided a detector particularly constructed for detecting the displacement of a point of interest. The basic structure of such a displacement detector is schematically shown in FIG. 5. It is to be noted that as practiced throughout the specification, like elements are indicated by like numerals. As shown in FIG. 5, the displacement detector embodying the present invention includes the light source 18 for emitting a light beam, convex lens 50 for focusing the light beam from the light source 18, the dual photodetector 20, which has been described in detail above, and a process unit 51 connected to the dual photodetector 20. With the elements shown in FIG. 5, it is so structured that one of the three elements, including the light source 18, the lens 50 and the dual photodetector 20 is movable in position with respect to the others which are fixed in position. One such supporting structure is shown in FIG. 2; that is, the light source 18 and the photodetector 20 may be fixed in position with the lens 50 being movable with respect to the light source 18 and the photodetector 20. It is to be noted, however, that, in this case, no feedback circuit is provided. The process unit 51, for example, includes an op amp comparator having one input connected to one of the photodiodes 20a and 20b and the other input connected to the other of the photodiodes 20a and 20b, wherein such an op amp comparator supplies an output signal indicating the position of the lens 50, or point of interest, with respect to the stationary supporting structure. It is to be noted that, instead of the lens 50, either the light source 18 or the photodetector 20 may be alternatively constructed to be movable with respect to the rest.

Figure 6:
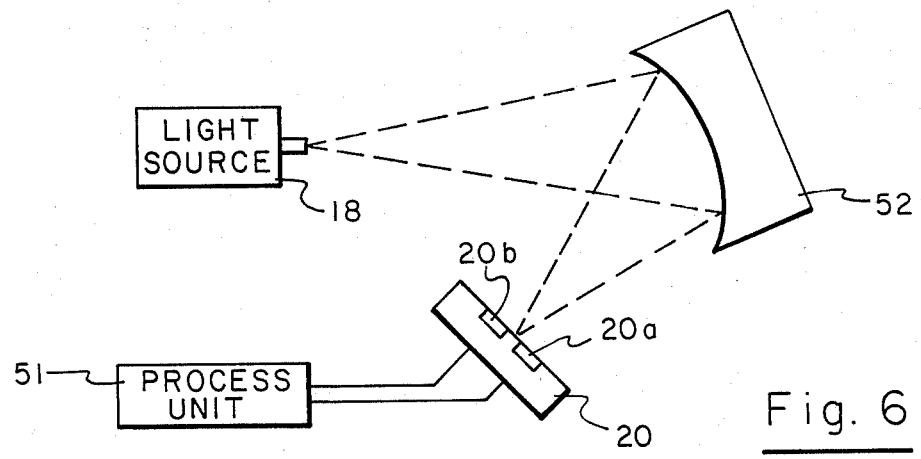
FIG. 6 is a schematic illustration showing another embodiment of the displacement detector which is constructed as modified from the structure shown in FIG. 5.

FIG. 6 shows an alternative structure modified from the structure shown in FIG. 5. In this modified structure, the convex lens 50 has been replaced by a concave mirror 52. As the light source 18, use may be preferably made of a laser, including He-Ne, Ar, YAG and $CO_2$ lasers, laser diode, light-emitting diode, EL device and plasma discharge device. However, the referred light source has an extremely small light-emitting region for emitting light of high luminosity.

Figure 7:
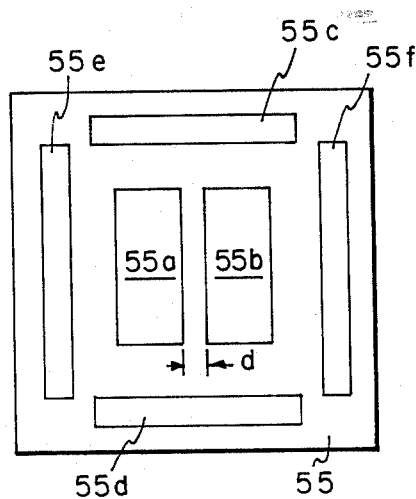
FIGS. 7 and 8 are plan views showing alternative structures of the dual photodetector which are suitable for use in the detector shown in FIG. 5 or 6.
Figure 8:
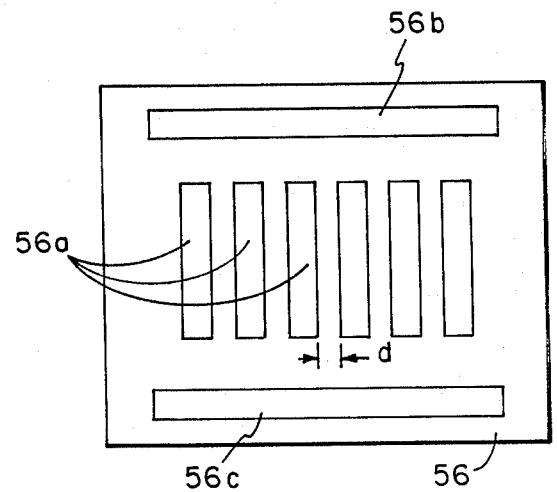

FIGS. 7 and 8 show alternative structures of the dual photodetector 20, which are suitable for use in the present displacement detector. In the structure shown in FIG. 7, a photodetector 55 in the form of a single semiconductor chip is provided with a pair of detector photodiodes 55a and 55b arranged side-by-side with a predetermined gap d therebetween. For example, if the gap d is set approximately at 10 microns using the beam spot having a diameter of approximately 10 microns as magnified approximately 5 times by the lens, the displacement of the lens in the order of 2 angstroms can be detected. The photodetector 55 is also provided with four alignment photodiodes 55c–55f, which are arranged to substantially surround the pair of detector photodiodes 55a and 55b. On the other hand, FIG. 8 shows a multiple photodetector 56 which includes a plurality (6 in the illustrated embodiment) of photodiodes 56a arranged in a line spaced apart from one another over a predetermined distance d with their longitudinal axis detected perpendicular to the line of arrangement. Such a structure makes it possible to expand the operational range of the present displacement detector. The photodetector 56 is also provided with alignment photodiodes 56b and 56c.

Figure 9:
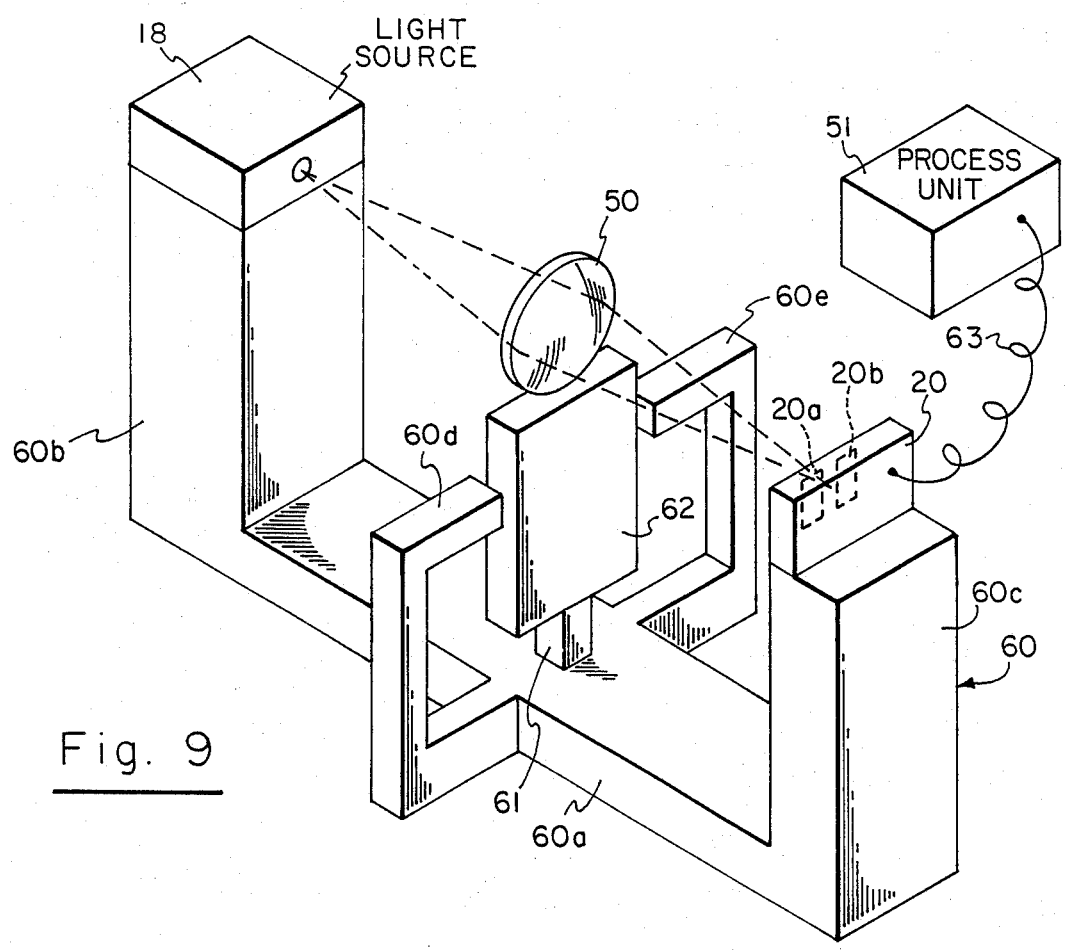
FIG. 9 is a schematic illustration showing one embodiment of the vibration detector for detecting the vibration of a point of interest constructed in accordance with a further aspect of the present invention.

A further aspect of the present invention will now be described with particular reference to FIGS. 9 and 12. In accordance with this aspect of the present invention, there is provided a detector particularly suited for use in detecting the vibration of a point of interest. One such vibration detector embodying the present invention is illustrated in FIG. 9. As may be noticed, the illustrated vibration detector is similar in structure to the optical seismic detector shown in FIG. 2; however, here again, no feedback circuit is provided. The vibration detector shown in FIG. 9 includes a support 60 which has a horizontal base 60a and a plurality of arms 60b–60e which are provided integrally with and extending generally vertically upward from the base 60a. For example, the arm 60b is provided at one end of the horizontal base 60a integrally therewith and the light source 18, such as a laser diode or light-emitting diode, is fixedly mounted at the top end surface of the arm 60b. On the other hand, the arm 60c is provided at the other end of the horizontal base 60a similarly integrally therewith for supporting the dual photodetector 20 at the top end surface thereof as fixedly attached thereto. Midway between the arms 60b and 60c is disposed a swinging member 62 as mounted on the base 60a via an elastic connector 61, the swinging member 62 may return to its original center position automatically even if it is caused to move out of the center position as a result of application of an external force. The remaining arms 60d and 60e are provided integrally with the base 60a as disposed on both sides of the swinging member 62 and spaced apart therefrom. Thus, the arms 60d and 60e, in effect, serve as stoppers for limiting the movement of the swinging member 62.

In the embodiment illustrated in FIG. 9, the convex lens 50 is provided as fixedly attached to the top end surface of the swinging member 62. The convex lens 50 serves as a focusing element for having the light beam emitted from the light source 18 focused on the main surface of the photodetector 20 having a pair of detector photodiodes 20a and 20b. It should thus be noted that the convex lens 50 may be replaced by any other focusing element, and, in fact, it is preferably replaced by the rod lens as described previously mainly because of its capability to obtain an enhanced structural integrity. The photodetector 20 is connected to the process unit 51 via a line 63 so that any motion of the beam spot caused by the motion of the swinging member 62 may be detected. In the present embodiment, it is so structured that the lens 50 is movable with respect to the light source 18 and the photodetector 20, which are stationary. However, as alternative structures, it may be structured such that any one of the light source 18, the lens 50 and the photodetector 20 can be made to be movable with respect to the rest.

Figure 10:
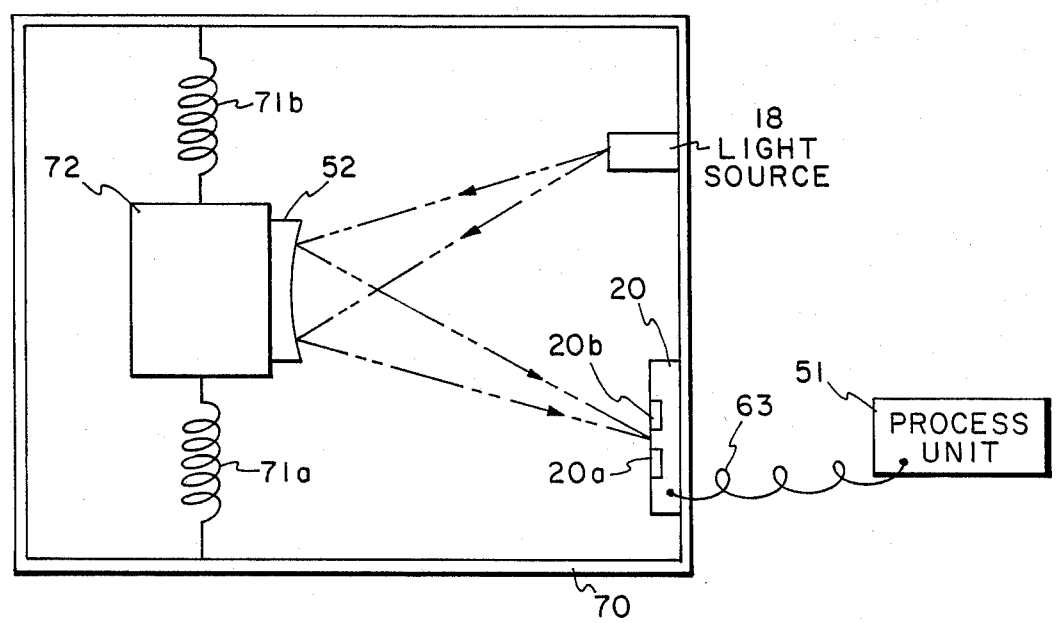
FIG. 10 is a schematic illustration showing another embodiment of the vibration detector constructed on the same principle as that of FIG. 9.

FIG. 10 shows another embodiment of the present vibration detector. In this case, there is provided a housing or case 70 of any desired shape, such as a box, and the light source 18 and the dual photodetector 20 are fixedly mounted on one wall of the case 70 and spaced apart from each other. A swinging member 72, defining a moving mass, is disposed inside of the case 70, suspended by a pair of springs 71a and 71b. The springs 71a and 71b are selected such that they have a tendency to locate the swinging member 72 at a predetermined location. The concave mirror 52 is fixedly attached at one side surface of the swinging member 72 such that the light beam from the light source 18 may be focused onto the surface of the photodetector 20, which is connected to the process unit 51 via the line 63. With this structure, when a vibration is imparted to the case 70, there is produced a relative motion between the swinging member 72 and the case 70, which then causes the beam spot focused on the photodetector 20 to move. Since use is made of the dual photodetector in the form of a single chip, the detection sensitivity is extremely high and the mounting and alignment steps in manufacture are greatly facilitated.

FIGS. 11 and 12 show two alternative embodiments which are modified from and basically similar in structure to the embodiment shown in FIG. 9. In the embodiment of FIG. 11, the light source 18 and the lens 50 are fixed in position and the photodetector 20 is movable. On the other hand, in the embodiment of FIG. 12, the photodetector 20 and the lens 50 are fixed in position and the light source 18 is movable in position.

As described in detail above, in accordance with the present invention, there is provided a detector for detecting the accleration, the velocity, the displacement or the vibration of a point of interest at high accuracy and sensitivity. When use is made of a dual photodetector in the form of a single semiconductor chip, the resolution and sensitivity can be increased significantly and the mounting process can be greatly simplified since it does not require the alignment between the two photodiodes. Furthermore, since the two or more photodiodes are provided in a particular pattern on the same single substrate, the structural integrity is extremely high thereby allowing for use under the roughest condition without causing any problem. Furthermore, when use is made of a rod lens, e.g., sulfoc lens, as an optical system for focusing the light beam from the light source onto the photodetector, the structural integrity of the detector can be further increased while facilitating the manufacturing process.

It is to be noted that, although the present invention has been described in detail with respect to particular embodiments, the present invention should not be limited only to those described above and it can embrace other alternatives without departing from the technical scope of the present invention.

We claim:

1. A servo accelerometer comprising:
    support member;
    a permanent magnet provided in fixed position on said support member;
    a coil positioned such as to be capable of producing a magnetic field which can magnetically interact with said permanent magnet;
    moveable supporting means including a vertical supporting rod and a horizontal supporting rod carried by said support member for supporting said coil moveably with respect to said permanent magnet;
    a light source provided in fixed position on said support member for emitting a light beam;
    light-receiving means provided in a fixed position on said support member for receiving said light beam from said light source, said light-receiving means being spaced apart from said light source;
    means coupled to said light-receiving means for producing a signal indicative of the position of impingement of said light beam on said light-receiving means;
    an optical system fixedly mounted on said movable supporting means intermediate said light source and said light-receiving means for magnifying the effect of lens displacement on said light-receiving means, said optical system comprising a quater pitch gradient index rod lens, said lens being affixed to said vertical supporting rod; and a servo amplifier for applying a driving current to said coil in response to said signal produced from said signal producing means.

2. The accelerometer of claim 1 wherein said movable supporting means further includes a deflectable connector plate having one end fixed in position to said support member and its opposite end fixedly connected to the bottom of said vertical supporting rod.

3. The accelerometer of claim 2 wherein said deflectable connector plate is provided with a horizontal groove on opposite surfaces thereof to provide a thinned region thereby allowing said connector plate to deflect along said thinned region.

4. The accelerometer of claim 3 wherein said deflectable connector plate with a center hole to provide an enhanced deflectability.

* * * * *